United States Patent [19]

Ashmore et al.

[11] Patent Number: 5,305,646
[45] Date of Patent: Apr. 26, 1994

[54] GAUGE FOR COMPRESSIBLE MEDIUM

[75] Inventors: James D. Ashmore, Hohenwald, Tenn.; Tommy K. Lawson, Stanford, Ky.

[73] Assignee: Dana Corporation, Toledo, Ohio

[21] Appl. No.: 830,390

[22] Filed: Feb. 3, 1992

[51] Int. Cl.$^5$ .............................. G01N 3/08
[52] U.S. Cl. .................................. 73/818
[58] Field of Search ............... 73/81, 82, 825, 866, 73/865.5, 54.36, 818

[56] References Cited

U.S. PATENT DOCUMENTS

| | | |
|---|---|---|
| 1,723,404 | 6/1927 | Brown . |
| 2,282,904 | 5/1942 | Tea .................... 73/81 |
| 2,376,814 | 8/1943 | Robinson . |
| 2,474,118 | 10/1945 | Robinson . |
| 2,703,492 | 3/1955 | Brissette et al. . |
| 2,891,399 | 2/1957 | Rufolo . |
| 3,618,369 | 11/1971 | Hamilton et al. ............... 73/81 |
| 3,630,074 | 12/1971 | Hartman . |
| 3,750,467 | 8/1973 | Rubio et al. ............... 73/825 |
| 4,331,026 | 5/1982 | Howard et al. ............... 73/81 |
| 4,505,278 | 3/1985 | Albon ....................... 73/81 |
| 4,578,868 | 4/1986 | Sasaki et al. . |
| 4,616,508 | 10/1986 | Jorn ........................ 73/825 |
| 4,709,584 | 12/1987 | Voll et al. ............... 73/864.44 |

*Primary Examiner*—Robert Raevis
*Attorney, Agent, or Firm*—Dykema Gossett

[57] ABSTRACT

An improved gauge for measuring the thickness and construction of a compressible material, such as gasket material, is disclosed. The gauge includes a pneumatic cylinder maintaining an upper probe at a first vertical position. The cylinder is selectively opened such that the upper probe may fall vertically against a compressible material to be tested. A predetermined weight is attached to the upper probe such that the upper probe is biased vertically downwardly by the weight. An electronic gauge measures the amount of deformation of the compressible material due to the predetermined weight, and an indication of the thickness and quality of the compressible material is made based on the amount of measured deformation.

5 Claims, 6 Drawing Sheets

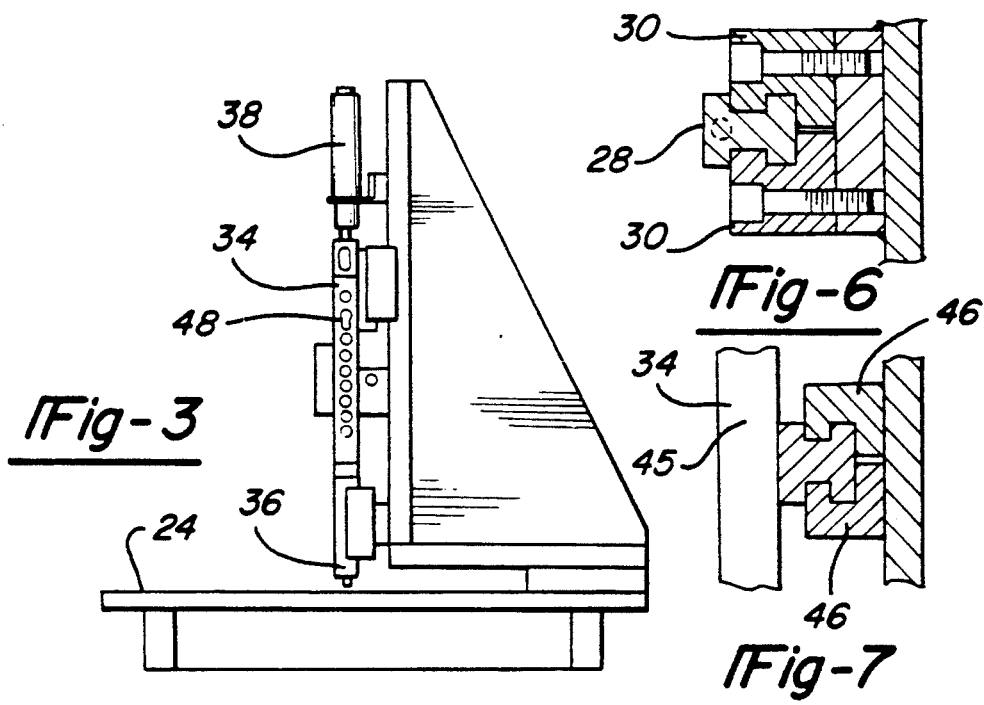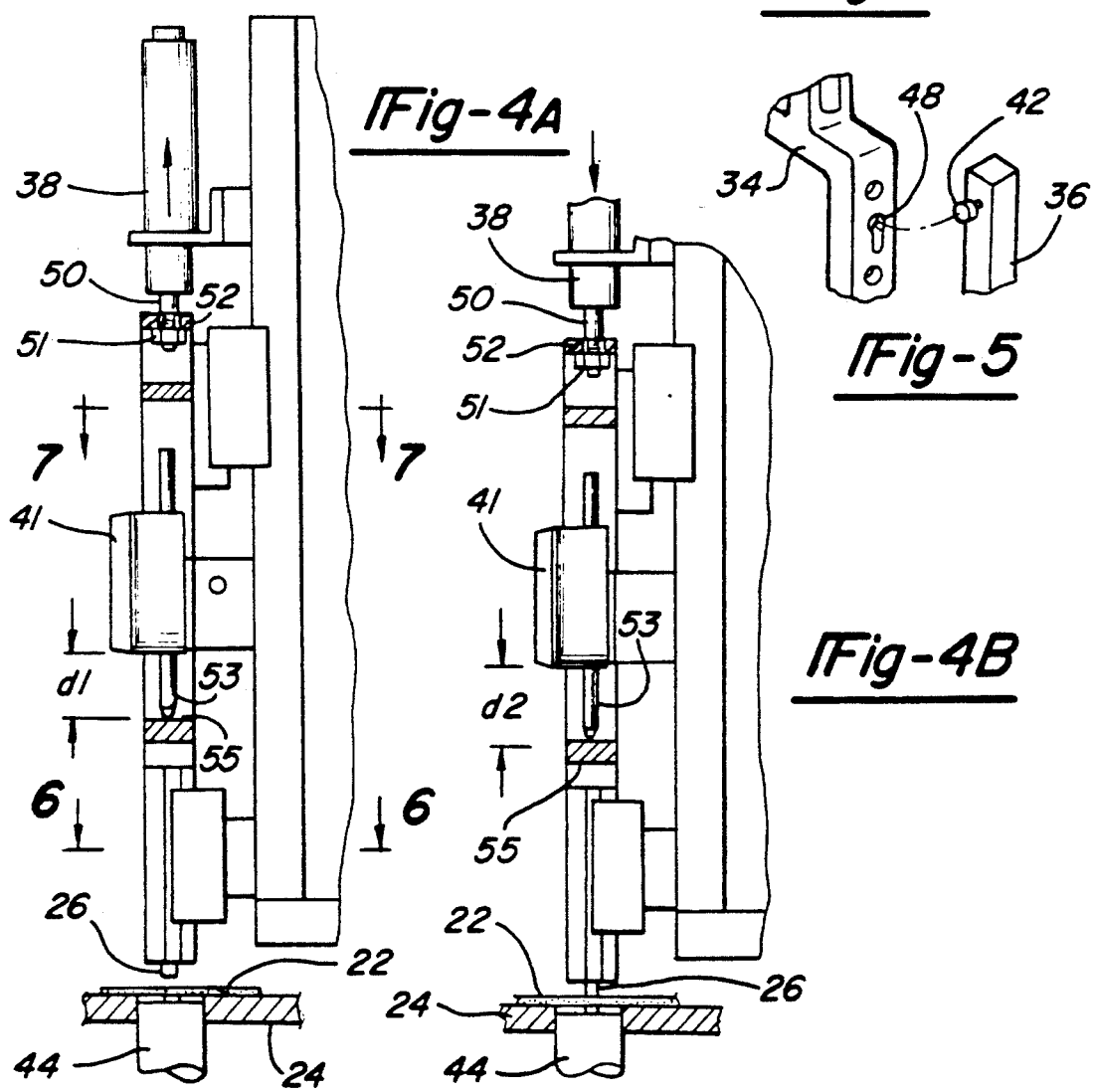

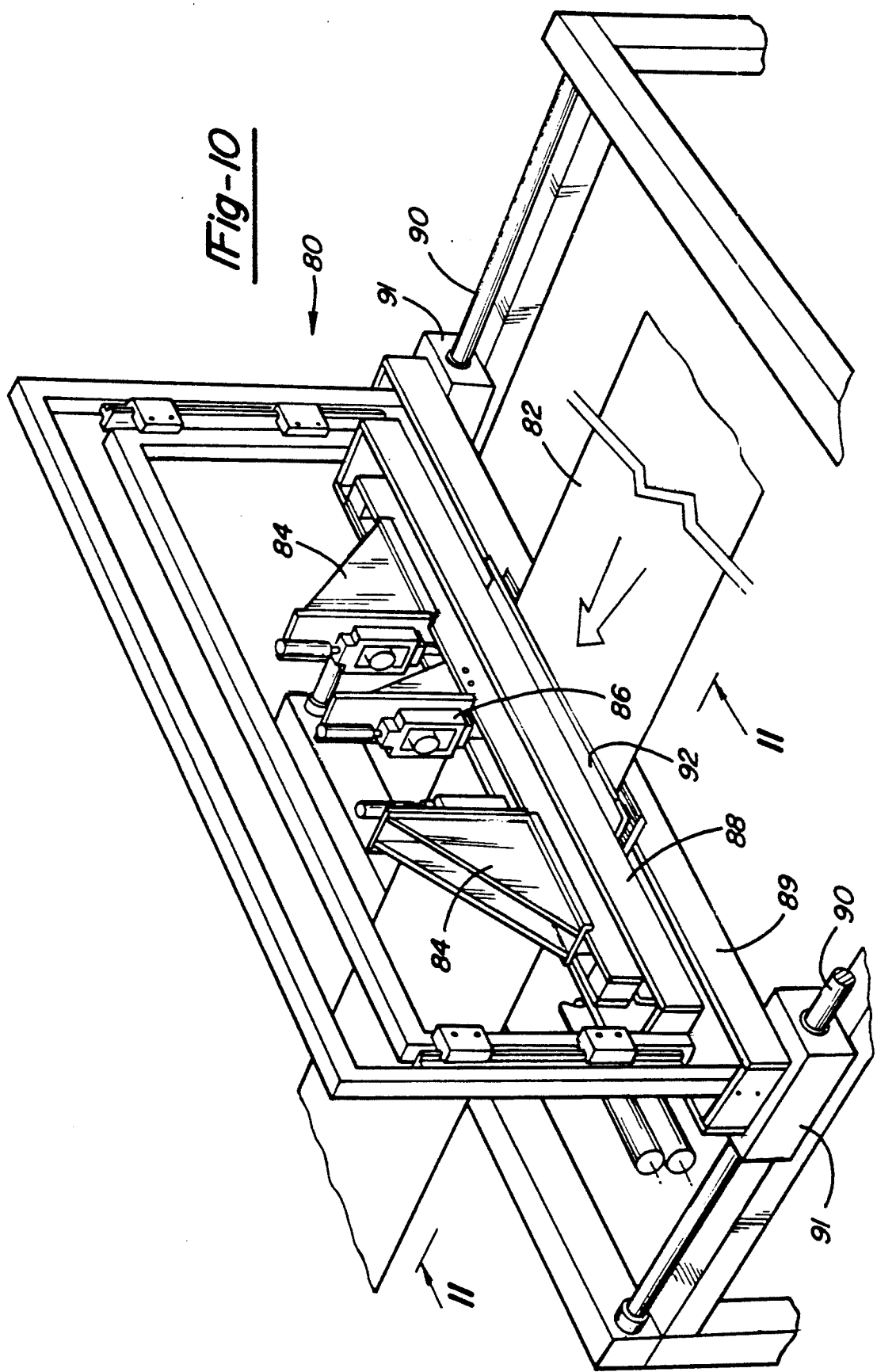

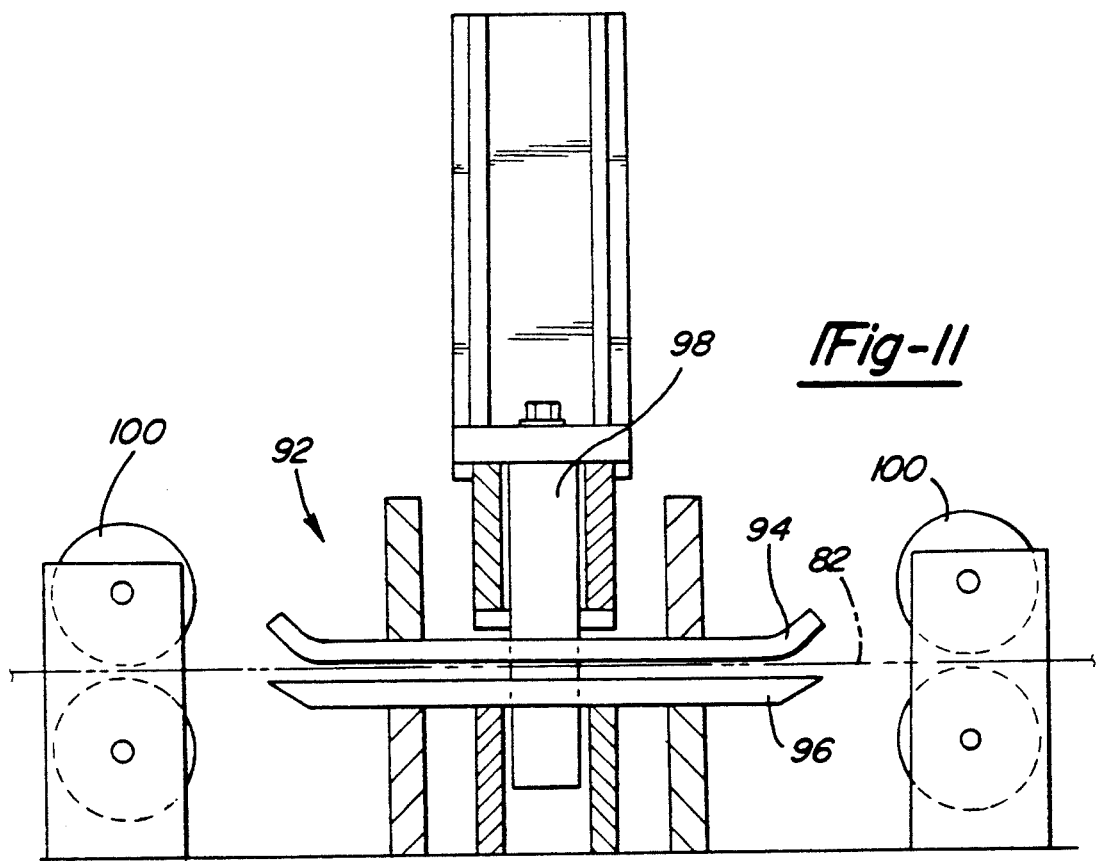

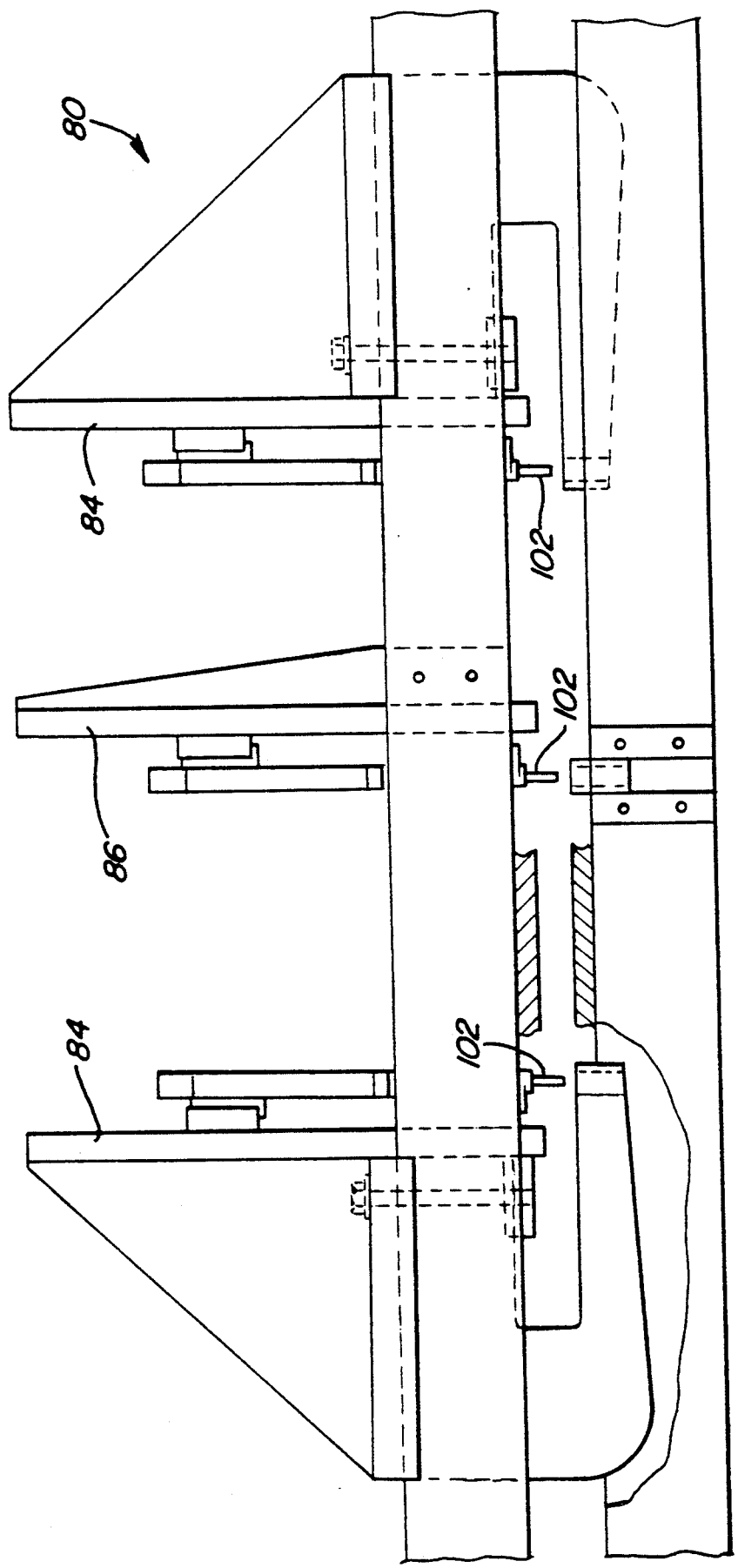

GAUGE FOR COMPRESSIBLE MEDIUM

BACKGROUND OF THE INVENTION

This invention relates to testing compressible material.

Various gauges are known in the prior art for measuring the thickness of a compressible material, such as a gasket material. One prior art gauge utilizes a weight that forces a probe into the compressible material. A sensor measures the amount of deformation of the compressible material due to the weight. The measured deformation is compared to an expected deformation to provide an indication whether the compressible material is of the proper thickness and construction. While the prior art gauge has proven relatively promising in accurately testing a compressible medium, it would be desirable to improve its construction.

In particular, use of the known gauge involves placing a weight at a location in the center of the gauge, but the structure of the known gauge does not ensure that the weight is accurately centered on the gauge. This may result in the weight not producing proper amount of deformation and the test giving inaccurate results. Further, the prior art gauge is allowed to fall freely under the influence of the weight. If the gauge falls at a rate outside of a predetermined range, it may not cause the proper amount of deformation.

SUMMARY OF THE INVENTION

In a disclosed embodiment, a gauge includes a cylinder which holds a bracket at a first vertical position. A movable probe is attached to the bracket, and is spaced from a fixed probe by a predetermined distance when the gauge is held at the first vertical position by the cylinder. A predetermined weight is attached to the bracket. A compressible material, such as gasket material, is placed between the movable and fixed probes, and the cylinder is opened such that a piston within the cylinder falls. The cylinder no longer holds the bracket and movable probe at the first vertical position, but allows them to fall downwardly onto the gasket material. The cylinder provides a damper force limiting the speed of downward movement of the bracket and movable probe as they fall. The movable probe contacts the gasket material and causes some measurable deformation. An electronic sensor measures the amount of deformation due to the predetermined weight. The measured deformation is compared to an expected deformation to provide an indication whether the thickness and construction of the gasket material is proper. If the thickness or construction is improper the measured deformation will be different than the expected deformation.

In a further feature of the present invention, the weight is attached to the bracket at lateral positions equally spaced about a center axis of the bracket. The movable and fixed probes are aligned on the center axis. The weight is thus applied to the compressible material directly along the axis of the movable probe, and accurate results are obtained.

In further features of the present invention, a plurality of such gauges are spaced laterally across the gasket material, and may also be movable longitudinally with a moving gasket material.

These and other features of the present invention can be best understood from the following specification and drawings, of which the following is a brief description.

BRIEF DESCRIPTION OF THE DRAWINGS

FIG. 3 is a partial side view of the gauge illustrated in FIG. 1.

FIG. 4A is a cross-sectional view through a portion of the gauge illustrated in FIG. 3.

FIG. 4B is a view similar to FIG. 4A.

FIG. 5 is an enlarged view of a portion of the present invention.

FIG. 6 is a cross-sectional view along line 6—6 as shown in FIG. 4A.

FIG. 7 is a cross-sectional view along line 7—7 as shown in FIG. 4A.

FIG. 10 is a perspective view of a third embodiment of the present invention.

FIG. 11 is a cross-sectional view along line 11—11 as shown in FIG. 10.

FIG. 12 is a cross-sectional view through the third embodiment gauge.

DETAILED DESCRIPTION OF A PREFERRED EMBODIMENT

Figure 1:
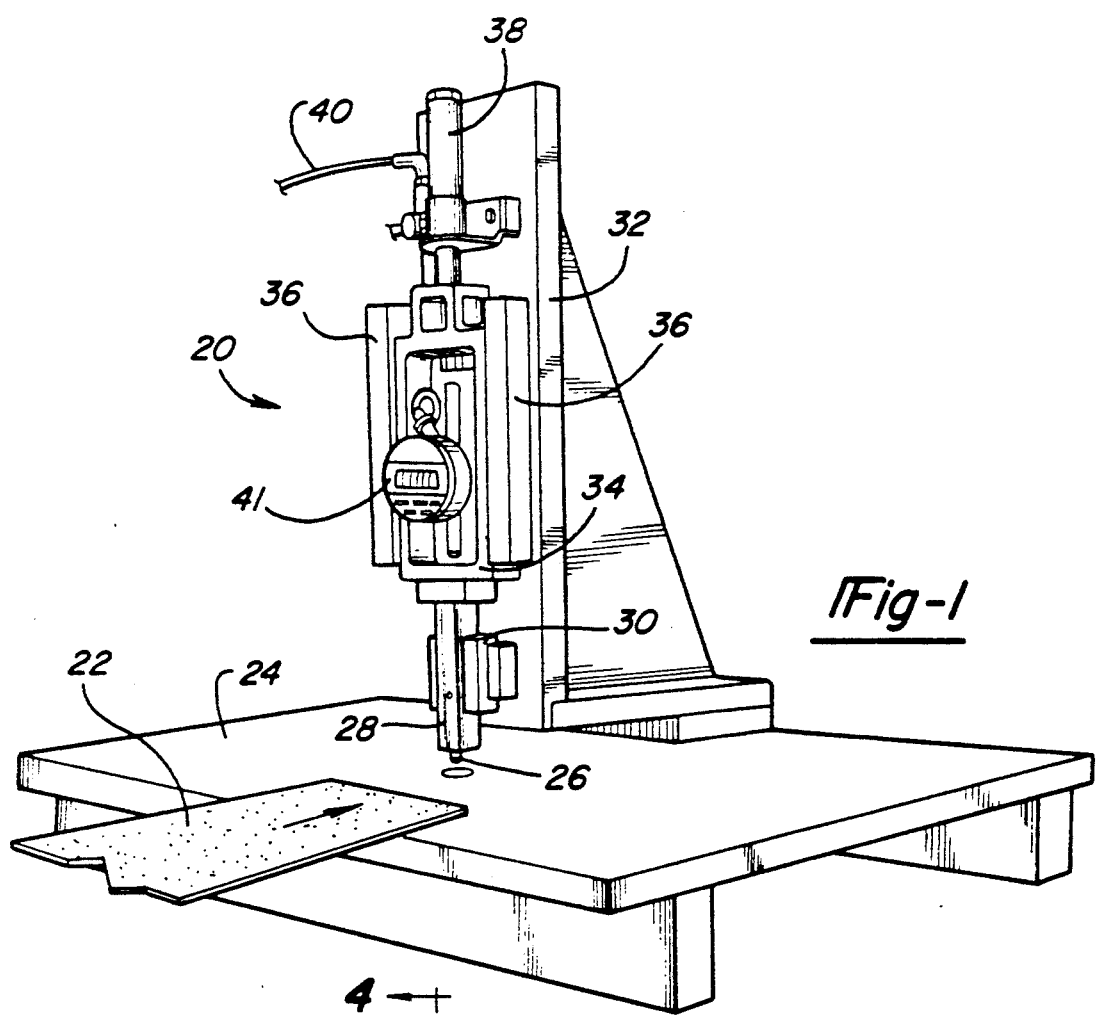
FIG. 1 is a perspective view of a first embodiment gauge according to the present invention.

A gauge 20 for testing a gasket material 22 is illustrated in FIG. 1. A platform 24 supports gasket material 22, and a movable upper probe 26 is brought into contact with gasket material 22. Upper probe 26 is fixed to a movable rail 28 which is slidably supported in a bearing 30. A housing 32 slidably supports a bracket 34 which is fixed to movable rail 28. A pair of laterally spaced weights 36 are mounted on each lateral side of bracket 34, such that the weights are equally spaced about a center axis of movable rail 28 and probe 26.

A cylinder 38 is fixed to a top end of bracket 34, and a fluid line 40 controls fluid within cylinder 38. When fluid line 40 is closed, a piston (not shown in this figure) is held stationary within cylinder 38 and maintains bracket 34 at a fixed vertical position. When line 40 is opened, cylinder 38 can drain, and the piston falls. Consequently, bracket 34, weights 36, movable rail 28 and upper probe 26 all fall towards gasket material 22. Cylinder 38 may be a pneumatic cylinder.

Upper probe 26 falls until it contacts gasket material 22. The weights 36 then cause some deformation of gasket material 22 by upper probe 26. An electronic sensor 41 determines the amount of deformation of gasket material 22 due to the predetermined weight applied from weights 36. An expected amount of deformation for a gasket material 22 having the appropriate thickness and construction is known. The amount of expected deformation for the predetermined weight is compared with the amount of measured deformation to provide an indication of whether gasket material 22 is of proper thickness and construction.

Figure 2:
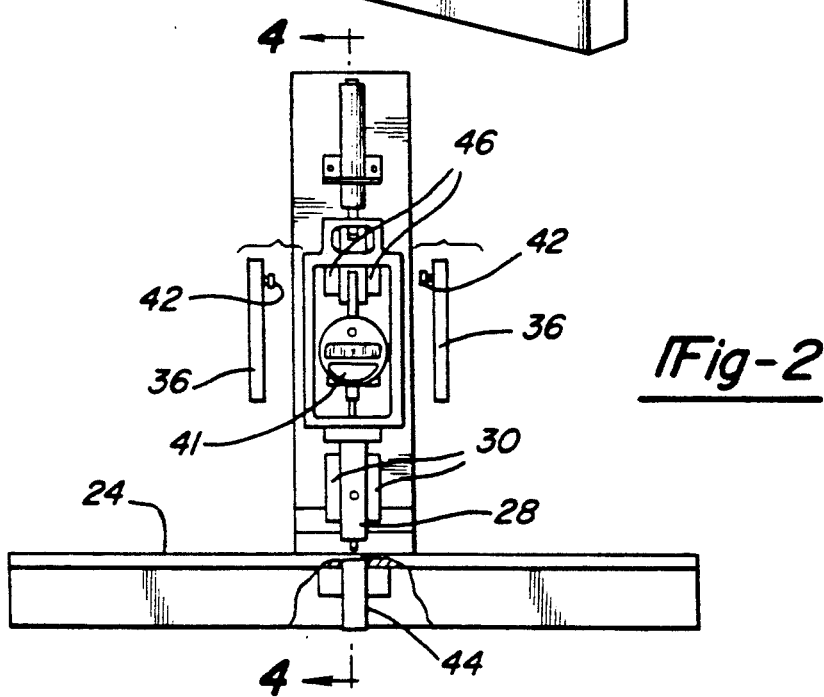
FIG. 2 is a front view of the gauge illustrated in FIG. 1.

As shown in FIG. 2, the weights 36 have mounting ears 42 and are mounted at lateral sides of bracket 34. A lower probe 44 is received beneath platform 24, such that it extends slightly above the surface of platform 24.

In one preferred embodiment, lower probe 44 extends 0.004 inch above platform 24. The position of lower probe 44 is adjustable within a threaded bore within platform 24. Upper probe 26 is coaxial with lower probe 44, such that gasket material 22 is pinched between probes 26 and 44. As mentioned above, the weights 36 are evenly spaced about the axis of probe 26 and, consequently, probe 44, such that the weight is evenly distributed.

Bearings 46 support bracket 34 at a vertically upper position. Movable rail 28 is supported at a vertically lower position by bearings 30. Bearings 46 and 30 ensure the movement of bracket 34 and rail 28 is directly vertically downwardly. If the movement of the members were at an angle to a vertical axis, the amount of deformation measured by electronic sensor 41 might not be a true indication of the amount of deformation of the gasket material 22.

FIG. 3 is a side view of gauge 20, and shows keyhole shaped slots 48 in the bracket 34 which receive ears 42 of weights 36. Keyhole shaped slots 48 have an enlarged upper portion and a smaller lower portion. Ears 42 are inserted into the enlarged upper portion and moved downwardly into the smaller lower portion to secure weights 36 to bracket 34. This facilitates the attachment of weights 36 to bracket 34, such that the weight may be easily replaced to vary the loads applied to a particular gasket material 22.

As shown in FIG. 4A, pneumatic cylinder 38 includes a piston 50 having an enlarged member, such as a nut 51, received on a lower vertical side of a bracket upper portion 52. Piston 50 is biased into cylinder 38, such that it retains bracket portion 52 at a desired vertical position. In this position upper probe 26 is spaced from gasket material 22. A lower tip 53 of electronic sensor 41 extends into contact with a lower bracket surface 55. The position of lower tip 53 gives an indication to electronic sensor 41 that lower bracket surface 55 is spaced from electronic sensor 41 by a distance $d_1$.

As shown in FIG. 4B, cylinder 38 has been opened, and piston 50 has fallen downwardly relative to cylinder 38. Bracket 34 also falls, and upper probe 26 eventually contacts gasket material 22. Weights 36 cause deformation of the compressible gasket material 22. Lower tip 53 now indicates that lower bracket surface 55 is spaced from electronic sensor 41 by a distance $d_2$, which should be somewhat greater than distance $d_1$. The measured distance $d_2$ is used to calculate the amount of deformation of gasket material 22 by the applied weights 36 through a comparison with an expected amount of deformation related to a measured distance d2 for a gasket material 22 having the appropriate thickness and construction. By comparing the actual deformation to an expected deformation, an operator may determine whether gasket material 22 is of desired thickness and construction.

When cylinder 38 is open, is no positive connection between piston 50 and bracket portion 52. Thus, should piston 50 continue to fall after gasket material 22 resists further deformation due to weights 36, bracket 34 would not also move further vertically downwardly. Pneumatic cylinder 38 and piston 50 act as a damper to slow the descent of bracket 34 and probe 26, but do not apply any force to cause downward vertical movement. Such a force could cause inaccuracies in the measured deformation of gasket material 22.

As shown in FIG. 5, ears 42 are attached to weights 36, and may be moved into keyhole shape slots 48. This facilitates the easy attachment of weights 36 onto the lateral sides of bracket 34, and allows an operator to quickly change the applied weight.

As shown in FIG. 6, movable rail 28 is mounted between two bearings 30. Bearings 30 positively guide and support movable rail 28 for vertical movement. As shown in FIG. 7, rail 45 is fixed to a rear portion of bracket 34 and received between bearings 46. Bearings 46 provide guidance and support for rail 45, and bracket 34.

Figure 8:
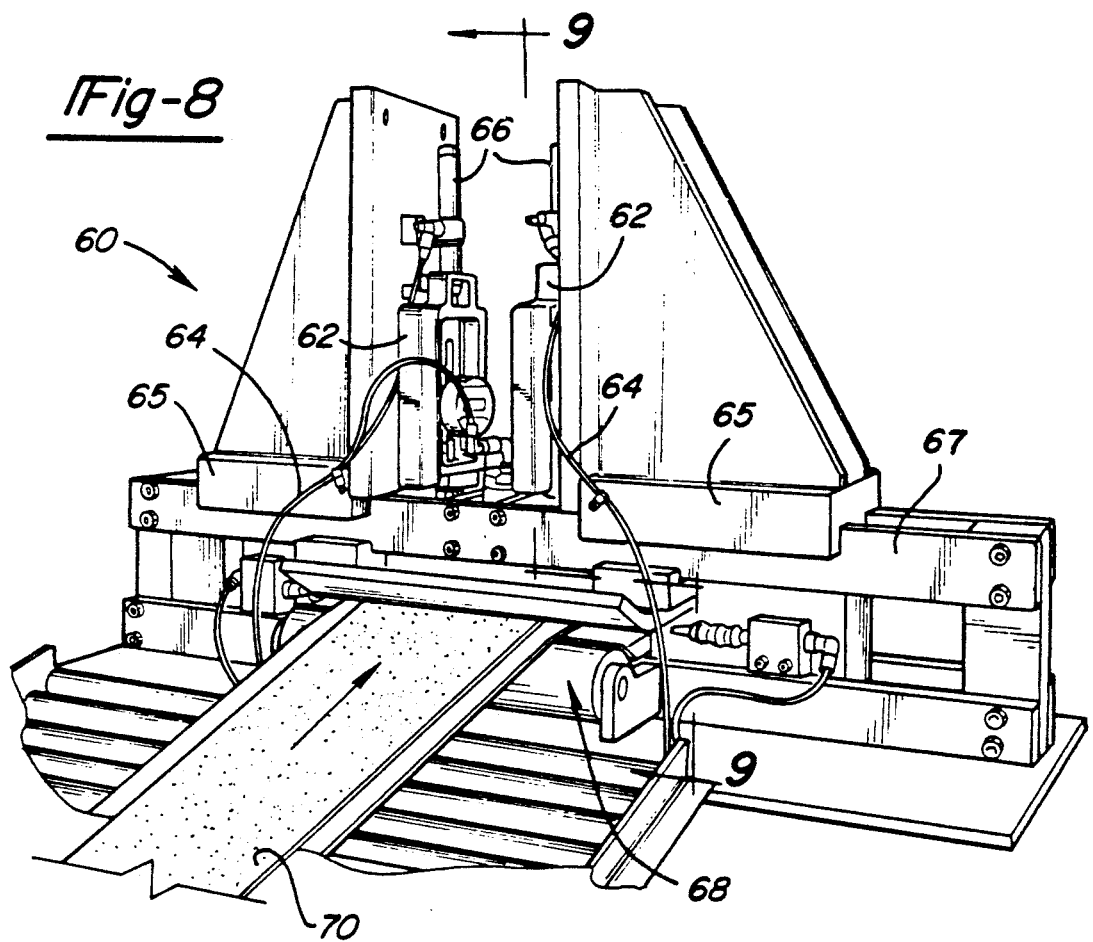
FIG. 8 is a perspective view of a second embodiment of the present invention.

FIG. 8 is a perspective view of a second embodiment gauge system 60 according to the present invention. Gauge system 60 has two laterally spaced gauges 62, each of which are similar in construction to gauge 20. Gauges 62 have lines 64 leading to pneumatic cylinders 66 which are automatically opened, such that gauges 62 operate automatically in response to control signals. The control signals to open lines 64 may be actuated in response to the movement of a predetermined amount of movement of gasket material 70, such that gauge system 60 makes periodic measurements of gasket material 70.

Gauges 62 are mounted by brackets 65 on track 67. Brackets 65 contain bolts that may be loosened such that the lateral positions of gauges 62 may be adjusted. In this way, an operator may vary the lateral positions at which gasket material 70 is measured. A press structure 68 ensures that the gasket material 70 moving into the area adjacent gauges 62 has a predetermined tension. The deformation due to a particular weight is thus more consistent.

Figure 9:
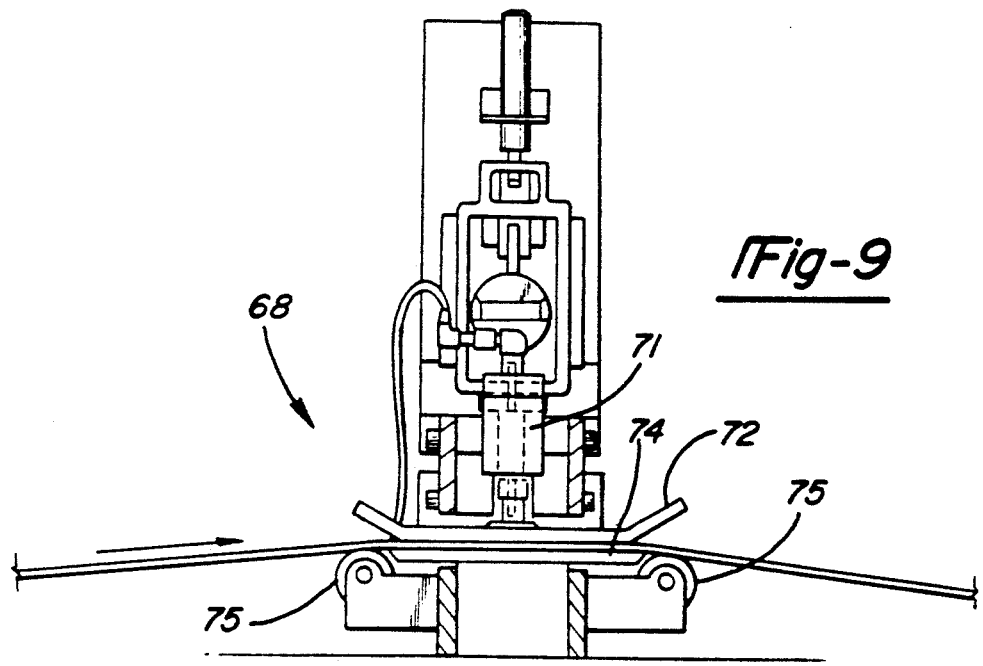
FIG. 9 is a cross-sectional view along line 9—9 as shown in FIG. 8.

As shown in FIG. 9, press structure 68 includes a piston 71 which forces a top plate 72 vertically downwardly towards a bottom plate 74. Plates 72 and 74 have a central space, such that the probes may move through the central space to contact gasket material 70. Rollers 75 are associated with bottom plate 74 both upstream and downstream of bottom plate 74.

FIG. 10 is a perspective view of a third embodiment gauge system 80 according to the present invention. In gauge system 80, a gasket material 82 is measured as it moves along a longitudinal direction. The gasket material can thus be tested as it is formed, without stopping the gasket material or a production line. A pair of end gauges 84, and a center gauge 86 test gasket material 82 at three laterally spaced locations. Gauges 84 and 86 are mounted on a lateral track 88 such that their lateral positions may be adjusted. Further, a mount 89 mounts all three gauges 84 and 86, and lateral track 88, and moves longitudinally along rail structure 90. Blocks 91 guide mount 89 on rail structure 90. Gauges 84 and 86 may thus move longitudinally along with gasket material 82.

A press structure 92 secures the gauges and mount 89 to the gasket material and also ensures that the tension in gasket material 82 is as desired when the measurements are performed. As gasket material moves in the direction of the arrow shown in FIG. 10, press structure 92 is engaged and mount 89 and the gauges are pulled longitudinally along with gasket material 82. Gauges 84 and 86 measure the deformation due to a particular weight on gasket material 82. When that measurement is complete, mount 89 is reciprocated back to a starting position, where the gauge system 80 may make a new measurement of subsequent gasket material 82. Preferably, a pneumatic cylinder drives mount 89 back to the starting position. More preferably, a rodless cylinder rail is used to drive mount 89.

As shown in FIG. 11, press structure 92 has spaced plates 94 and 96. A cylinder 98 forces plate 94 into contact with the gasket material 82 when gauges 84 and 86 are being used. A pair of spaced roller stations 100 (not shown in FIG. 10) ensure that the tension in the material 82 is as desired at positions upstream and downstream from plates 94 and 96 when plate 94 is not forced downwardly. This ensures that plate 94 will not damage gasket material 82 when the gauges 84 and 80 are not being used.

FIG. 12 shows probes 102 extending from gauges 84 and 86. The probes 102 are spaced across the lateral width of gauge system 80.

The weight is preferably varied for different gasket materials. An operator experimentally determines an expected amount of deformation for a particular gasket material and weight. The actual measured deformation is then compared to this expected deformation to determine whether a particular gasket material has been properly manufactured.

In one embodiment, the electronic sensor used was a Mitutoyo Digimatic Indicator, model 543-380, and was AC powered.

Preferred embodiments of the present invention have been disclosed. A worker of ordinary skill in the art would recognize, however, that certain modifications would come within the scope of this invention. For that reason, the following claims should be studied in order to determine true scope and content of this invention.

We claim:

1. A gauge for measuring characteristics of a compressible material comprising:
   a movable probe positioned at a first location and spaced a predetermined distance above the compressible material, said movable probe having an associated predetermined weight; and
   a cylinder including a piston holding said movable probe at said first location, said cylinder being actuatable to allow said movable prove to move from said first location towards the compressible material, wherein said predetermined weight is applied by a plurality of weights, wherein said weights are mounted at outer lateral portions of a bracket fixed to said movable prove, said weights each including an ear which may be inserted into an enlarged portion of a keyhole-shaped slot formed at each lateral side of said bracket, said ears being movable to lock said weight to said bracket.

2. A gauge as recited in claim 1, wherein a lower probe is aligned with said movable probe, such that the compressible material is captured between said movable probe and said lower prove.

3. A gauge as recited in claim 2, wherein said lower probe is adjustably mounted such that its vertical position may be adjusted.

4. A gauge as recited in claim 2, wherein said weights are spaced about a lateral center axis of said movable probe, said lower probe also being centered on said center axis.

5. A gauge for measuring characteristics of a compressible material comprising:
   a movable probe positioning at a first location and spaced a predetermined distance above the compressible material, said movable probe having an associated predetermined weight; and
   a cylinder including a piston holding said movable probe at said first location, said cylinder being actuatable to allow said movable probe to move from said first location towards the compressible material, wherein said piston has an enlarged member, said enlarged member abutting an upper bracket portion fixed to said movable probe for maintaining said movable probe at said first location when said cylinder is closed, said enlarged member and said upper bracket portion being free to move together vertically downwardly when said cylinder is opened, such that said upper bracket portion may move vertically downwardly, and said piston will move vertically therewith, said piston and said enlarged member being free to move vertically downwardly independently of said upper bracket portion after said upper bracket portion has stopped moving, permitting relative displacement between said piston and said upper bracket portion.

* * * * *

UNITED STATES PATENT AND TRADEMARK OFFICE
CERTIFICATE OF CORRECTION

PATENT NO. : 5,305,646

DATED : April 26, 1994

INVENTOR(S) : James D. Ashmore and Tommy K. Lawson

It is certified that error appears in the above-identified patent and that said Letters Patent is hereby corrected as shown below:

Column 5, line 39, "prove" should be "probe".

Signed and Sealed this

Twenty-third Day of August, 1994

Attest:

BRUCE LEHMAN

*Attesting Officer*     *Commissioner of Patents and Trademarks*